(12) United States Patent
Pauley et al.

(10) Patent No.: US 8,616,920 B2
(45) Date of Patent: Dec. 31, 2013

(54) METHOD AND APPARATUS PERTAINING TO MOVEMENT OF A SIM-CARD TRAY

(75) Inventors: Devin Bertrum Pauley, Dallas, TX (US); Jonathan J. Wollak, Woodridge, IL (US); Andrew Phong Le, Arlington, TX (US)

(73) Assignee: BlackBerry Limited, Waterloo (CA)

( * ) Notice: Subject to any disclaimer, the term of this patent is extended or adjusted under 35 U.S.C. 154(b) by 183 days.

(21) Appl. No.: 13/108,359

(22) Filed: May 16, 2011

(65) Prior Publication Data

US 2012/0295458 A1 Nov. 22, 2012

(51) Int. Cl.
*H01R 24/00* (2011.01)

(52) U.S. Cl.
USPC .......................................... 439/630; 439/159

(58) Field of Classification Search
USPC .................. 439/630, 159, 607.31, 607.32
See application file for complete search history.

(56) References Cited

U.S. PATENT DOCUMENTS

| | | | |
|---|---|---|---|
| 5,655,917 A * | 8/1997 | Kaneshige et al. | 439/155 |
| 6,261,113 B1 * | 7/2001 | Chen | 439/260 |
| 6,561,851 B2 * | 5/2003 | Florescu | 439/630 |
| 6,602,096 B1 * | 8/2003 | Kronestedt et al. | 439/630 |
| 7,081,020 B1 * | 7/2006 | Lee | 439/630 |
| 7,198,497 B1 * | 4/2007 | Lai et al. | 439/159 |
| 2002/0160661 A1 | 10/2002 | Florescu | |
| 2007/0105446 A1 * | 5/2007 | Lai et al. | 439/630 |
| 2007/0128913 A1 | 6/2007 | Zuo et al. | |
| 2012/0276780 A1 * | 11/2012 | Hu et al. | 439/630 |
| 2012/0309213 A1 * | 12/2012 | Lai | 439/159 |

FOREIGN PATENT DOCUMENTS

| | | |
|---|---|---|
| EP | 0701356 A2 | 3/1996 |
| EP | 1519543 A1 | 3/2005 |
| EP | 2026241 A2 | 2/2009 |

OTHER PUBLICATIONS

Extended European Search Report from related European Patent Application No. 11166450.4; Sep. 7, 2011; 6 pages.

* cited by examiner

*Primary Examiner* — Hae Moon Hyeon
(74) *Attorney, Agent, or Firm* — Fitch, Even, Tabin & Flannery LLP

(57) ABSTRACT

An apparatus comprises an assembly and a SIM-card tray configured to move, at least partially, into and out of the assembly to thereby selectively electrically connect and disconnect a SIM card that is disposed in the SIM-card tray to and from at least one electrical connector. A biasing member automatically urges movement of the SIM-card tray with respect to at least one of moving the SIM-card tray into the assembly and out of the assembly. By one approach this biasing member comprises a spring. By one approach this spring can serve to both automatically urge movement of the SIM-card tray into the assembly and out of the assembly. These teachings will accommodate a SIM-card tray configured to accommodate a micro-SIM card. These teachings will also accommodate a personal communication device having the aforementioned components.

15 Claims, 5 Drawing Sheets

METHOD AND APPARATUS PERTAINING TO MOVEMENT OF A SIM-CARD TRAY

TECHNICAL FIELD

This disclosed concept relates generally to SIM-card trays.

BACKGROUND

SIM cards are known in the art. (The acronym SIM is generally known to refer to both a "Subscriber Identity Module" as well as a "Subscriber Identification Module." The meanings are essentially synonymous with one another and therefore as used herein the acronym SIM will be understood to refer to both and either such meanings.) SIM cards typically comprise a carrier having an integrated circuit that stores a service-subscriber key as pertains, for example, to a given subscriber of wireless telephony services. The subscriber typically uses their SIM card by installing the SIM card in their portable communication device of choice.

The form factor of a given portable communication device can sometimes make the installation or removal of a SIM card challenging. This can be especially so when the SIM card comprises a micro-SIM card which is only 15 mm by 12 mm in size. Difficulties in these regards, in turn, can frustrate the end user or impair desired usability of the portable communication device.

Elements in the figures are illustrated for simplicity and clarity and have not necessarily been drawn to scale. For example, the dimensions, relative positioning, or both of some of the elements in the figures may be exaggerated relative to other elements to help to improve understanding of various embodiments of the present disclosed concept. Also, common but well-understood elements that are useful or necessary in a commercially feasible embodiment are often not depicted in order to facilitate a less obstructed view of these various embodiments of the present disclosed concept. Certain actions or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein

DETAILED DESCRIPTION

Generally speaking, pursuant to these various embodiments, an apparatus (such as a portable communication device) comprises an assembly and a SIM-card tray configured to move, at least partially, into and out of the assembly to thereby selectively electrically connect and disconnect a SIM card that is disposed in the SIM-card tray to and from at least one electrical connector. A biasing member automatically urges movement of the SIM-card tray with respect to at least one of moving the SIM-card tray into the assembly and out of the assembly.

By one approach this biasing member comprises a spring. By one approach this spring can serve to both automatically urge movement of the SIM-card tray into the assembly and out of the assembly.

These teachings will accommodate a SIM-card tray configured to accommodate a micro-SIM card. These teachings will also accommodate a personal communication device having the aforementioned components. So configured, a SIM card (including even a micro-SIM card) can be readily and easily installed in the personal communication device and removed from the personal communication device notwithstanding, for example, a tight and constrained operating environment. This, in turn, can facilitate a more assured and reliable manipulation of a SIM card and thus greater user satisfaction.

These teachings can be economically deployed and are readily applied in conjunction with numerous existing technologies and hence can serve to greatly leverage the continued viability of those technologies. These teachings are also highly scalable and will serve with a wide variety of different SIM-card sizes and application settings.

Figure 1:
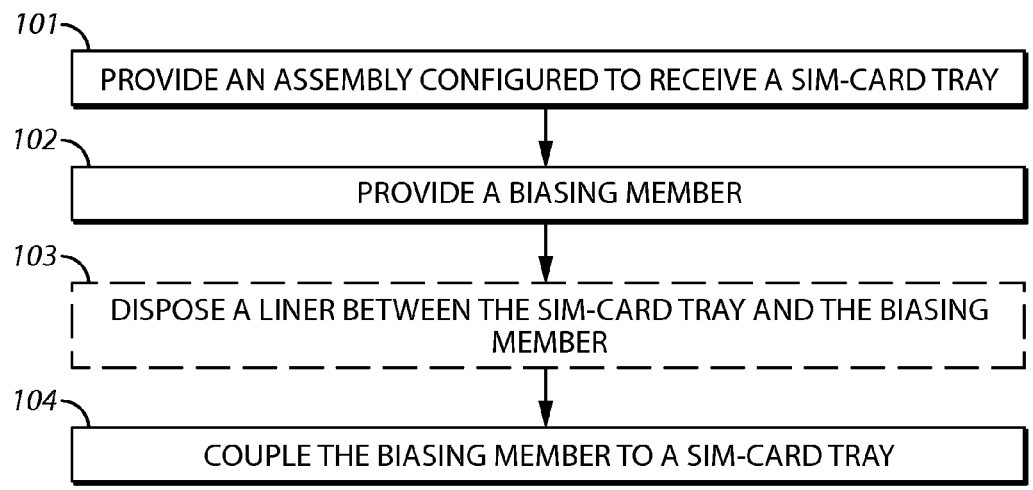
FIG. 1 comprises a flow diagram as configured in accordance with various embodiments of the disclosed concept.

These and other benefits may become clearer upon making a thorough review and study of the following detailed description. Referring now to the drawings, and in particular to FIG. 1, an illustrative process 100 that is compatible with many of these teachings will now be presented.

Figure 2:
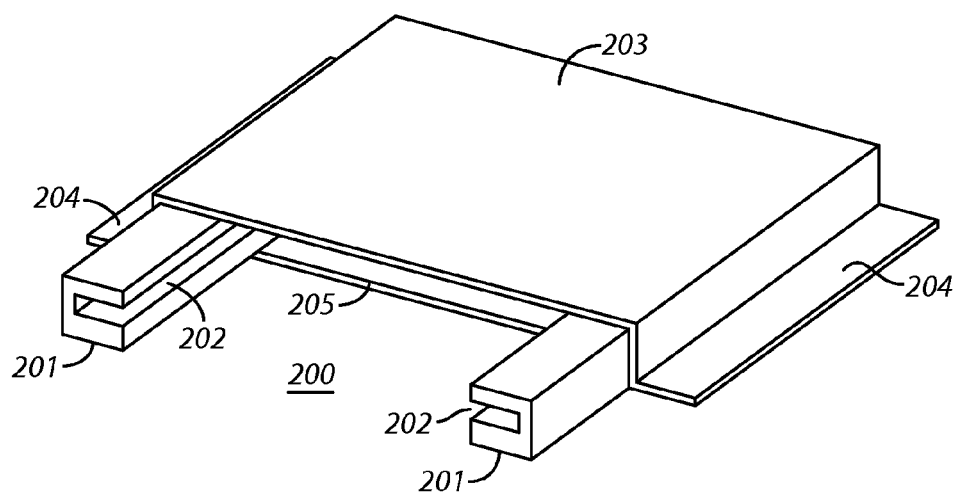
FIG. 2 comprises a perspective schematic view as configured in accordance with various embodiments of the disclosed concept.

This process 100 provides 101 an assembly configured to receive a SIM-card tray. This assembly can assume a variety of forms and sizes. FIG. 2 provides a non-limiting example. In this example the assembly 200 includes a pair of opposing side rails 201 that each have a notch 202 formed longitudinally therein to slidingly receive a SIM-card tray. A cover 203 spans and connects to these side rails 201 and includes side flanges 204 that can facilitate, for example, attaching the assembly 200 to a larger apparatus.

By one approach this assembly 200 also includes a bottom 205 that also connects to the side rails 201. Depending upon the application setting, however, either or both of the cover 203 and the bottom 205 may be comprised of portions of a larger assembly or apparatus. By one approach the bottom 205 can include a pivot post (not shown here) as described below.

These components of the assembly 200 can be comprised of any suitable material. The side rails 201, for example, can be comprised of a suitable plastic or metal material. In many cases it may be beneficial to form the cover 203 and bottom 205 of metal (such as aluminum or a suitable steel alloy) in order to provide strong yet thin members.

Figure 3:
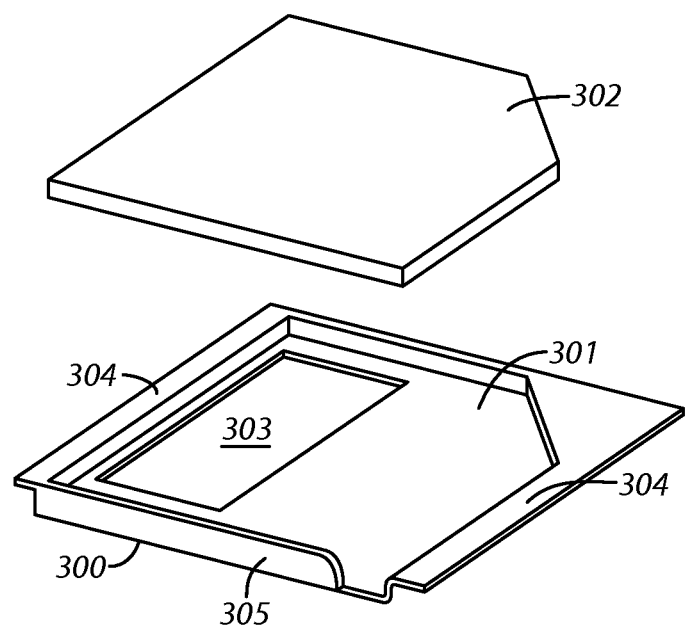
FIG. 3 comprises a perspective exploded schematic view as configured in accordance with various embodiments of the disclosed concept.

As mentioned above, this assembly 200 serves to receive a SIM-card tray. FIG. 3 provides a non-limiting example in these regards. Generally speaking this SIM-card tray 300 has a tray area 301 configured to conformally receive a corresponding SIM card 302. By one approach this SIM card 302 comprises a micro-SIM card and hence the SIM-card tray 300 comprises a micro-SIM-card tray.

By one approach the SIM-card tray 300 can have one or more openings 303 formed therethrough. The illustrated opening 303, for example, is sufficiently large to permit a user to push an object through that opening 303 in order to dislodge the SIM card 302 when seeking to remove the SIM card 302 from the SIM-card tray 300.

In this illustrative example the SIM-card tray 300 includes opposing side flanges 304. These side flanges 304 are sized and configured to fit within the aforementioned side-rail notches 202 of the assembly 200. The SIM-card tray 300 can also include a front side wall 305 that can serve, in part, as a handle to facilitate installation and removal of the SIM-card tray 300.

Again, the SIM-card tray 300 can be comprised of any suitable material. In many cases, however, where both a thin material and a strong material are sought an appropriate metal will serve well.

So configured, this SIM-card tray 300 is configured to move, at least partially, into and out of the assembly to thereby also move the corresponding SIM card 302 into and out of the assembly. This movement, in turn, will serve to selectively electrically connect and disconnect the SIM card 302 that is disposed in the SIM-card tray 300 to and from at least one electrical connector. (Such electrical connectors and this general sliding manner of connecting a SIM card into an operable connection with the electrical connector are known in the art. Accordingly, further elaboration in these regards is not provided here.)

Figure 4:
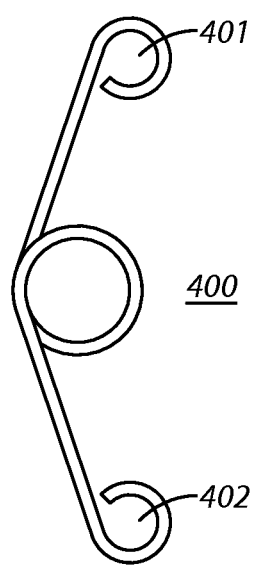
FIG. 4 comprises a top plan view as configured in accordance with various embodiments of the disclosed concept.

Referring now to FIGS. 1 and 4, this process 100 also provides 102 a biasing member. By one approach this biasing member can comprise one or more springs 400. FIG. 4 depicts one illustrative example in these regards in an at-rest state. By one approach this spring 400 can comprise a suitable metal such as spring-hardened stainless steel. By selecting an electrically-conductive material this spring 400 can also serve as a grounding path from the SIM-card tray 300 to thereby electrically protect the SIM card 302 when the SIM card 302 is disposed in the SIM-card tray 300. (In such a case, by grounding the SIM-card tray 300 this spring 400 can also protect other nearby sensitive electrical components.)

Figure 5:
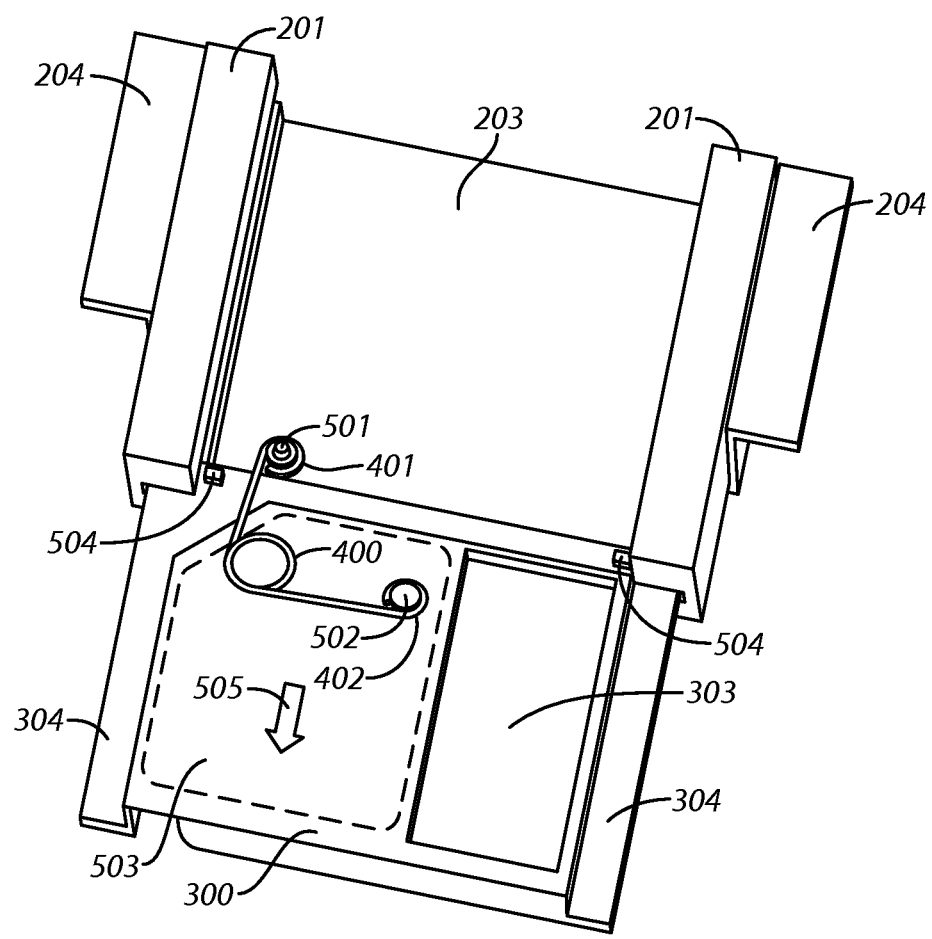
FIG. 5 comprises a perspective schematic view as configured in accordance with various embodiments of the disclosed concept.

As described below this biasing member couples to the SIM-card tray 300. With this in mind, this process 100 will accommodate optionally disposing 103 a liner between the SIM-card tray 300 and this biasing member. FIG. 5 provides an illustrative example of such a configuration. Here, this optional liner 503 (shown in phantom lines) comprises a slick, plastic coating disposed on the underside of the SIM-card tray 300 such that this liner 503 resides between the SIM-card tray 300 and the spring 400. So configured, portions of the spring 400 can more easily move with respect to the SIM-card tray 300 as the latter moves into and out of the aforementioned assembly.

FIG. 5 also illustrates that the SIM-card tray 300 can optionally include one or more tabs 504 or the like. In this illustrative and non-limiting example these tabs extend outwardly from the bottom side of the SIM-card tray 300. So configured, such a tab 504 can act as a stop to prevent the SIM-card tray 300 from being withdrawn more than a given corresponding distance from the assembly 200.

In any event, and with continued reference to FIGS. 1 and 5, this process 100 then provides for coupling 104 the biasing member to the SIM-card tray 300. Referring again to the non-limiting example provided above, the flanges 304 of the SIM-card tray 300 are disposed within the side-rail notches 202 of the aforementioned assembly 200. So configured, the SIM-card tray 300 can be readily slid in and out of the assembly 200 as desired.

In this particular illustrative example the aforementioned spring 400 has a first end 401 pivotally connected to a pivot post 501 such that the spring's first end 401 can readily rotate about the pivot post 501. This pivot post 501, in turn, can be connected (or otherwise coupled) to, for example, the aforementioned bottom 205 (not shown in FIG. 5 for the sake of clarity) of the assembly or to some other available structural element that will not move as the SIM-card tray 300 moves in and out of the assembly 200.

The opposing, second end 402 of the spring 400 pivotally connects in this illustrative example to the SIM-card tray 300 itself (by connecting, for example, to a pivot post 502 that comprises a part of the SIM-card tray 300 or that is otherwise connected to the SIM-card tray 300). FIG. 5 depicts the SIM-card tray 300 as being at least largely withdrawn from the assembly 200. So disposed, it will be understood that the spring 400 will tend to bias the SIM-card tray 300 outwardly of the assembly 200 as represented by the arrow denoted by reference numeral 505. In this case, if a user were to urge the SIM-card tray 300 inwardly of the assembly 200 by only a small amount, the spring 400 will push back against that force and tend to return the SIM-card tray 300 to some rest position if the user withdraws their effort.

Figure 6:
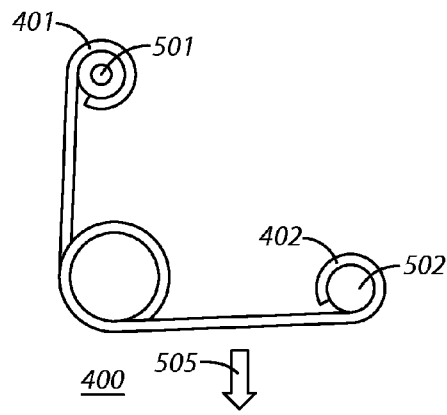
FIG. 6 comprises a top plan view as configured in accordance with various embodiments of the disclosed concept.
Figure 7:
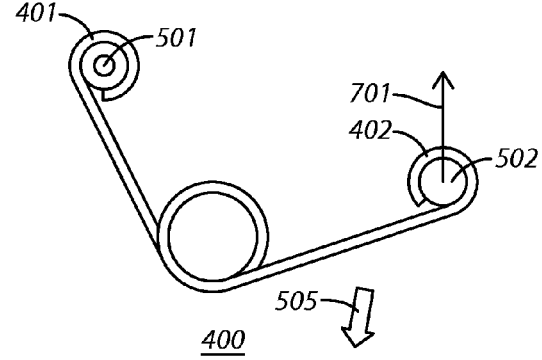
FIG. 7 comprises a top plan view as configured in accordance with various embodiments of the disclosed concept.

FIG. 6 illustrates this disposition of the spring 400 where the SIM-card tray 300 is essentially fully withdrawn from the assembly 200. As the SIM-card tray 300 is urged inwardly of the assembly (200) by, for example, a user's finger (not shown) asserting such a force, the second end 402 of the spring 400 will begin to move along with the SIM-card tray 300 and relative to the fixed-position first end 501 of the spring. FIG. 7 illustrates this movement by inclusion of the arrow that is denoted by reference numeral 701.

Figure 8:
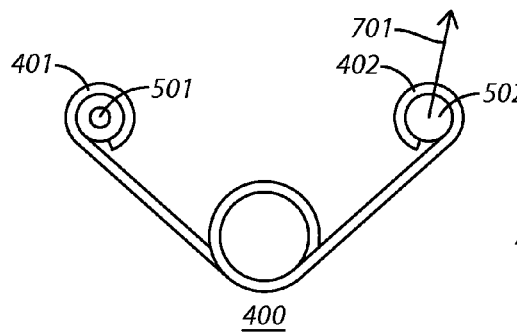
FIG. 8 comprises a top plan view as configured in accordance with various embodiments of the disclosed concept.
Figure 9:
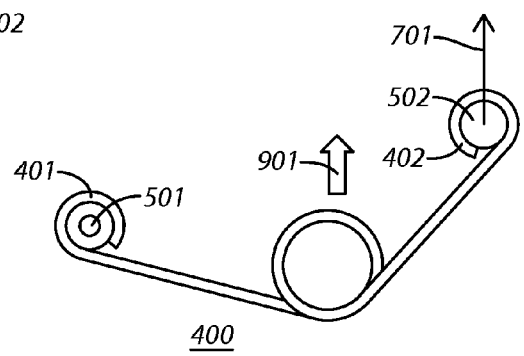
FIG. 9 comprises a top plan view as configured in accordance with various embodiments of the disclosed concept.

As suggested above, and as illustrated here, the spring 400 will continue to push back against such a force (as denoted by the arrow 505) until the second end 402 of the spring 400 reaches a point of relative equilibrium. FIG. 8 illustrates this transition point for this particular example. As the user continues to urge the SIM-card tray 300 inwardly of the assembly 200, the spring 400 will switch the direction of its bias and begin to urge the SIM-card tray 300 to continue moving inwardly. FIG. 9 illustrates such a state (where the arrow denoted by reference numeral 901 indicates the switched direction of bias).

Figure 10:
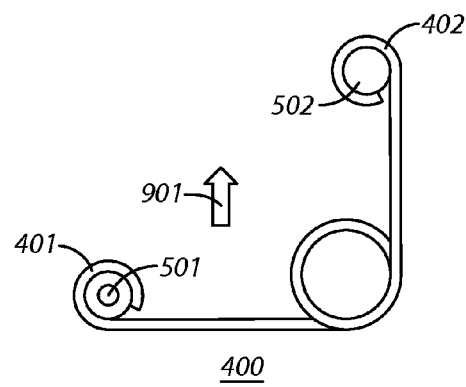
FIG. 10 comprises a top plan view as configured in accordance with various embodiments of the disclosed concept.
Figure 11:
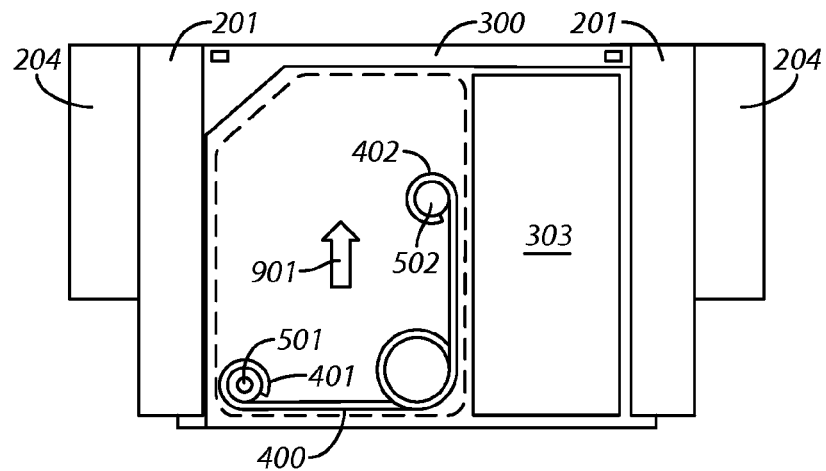
FIG. 11 comprises a top plan schematic view as configured in accordance with various embodiments of the disclosed concept.

So configured, the spring 400 itself now works to complete drawing the SIM-card tray 300 inside the assembly 200. This movement continues until, in this example, the SIM-card tray 300 becomes seated at a desired stopping point (and the SIM card 302 becomes coincidentally electrically connected to a corresponding electrical connector as desired). FIG. 10 illustrates this state in general for the spring 400 while FIG. 11 provides a view of the SIM-card tray 300 as fully inserted within the assembly 200 as per this action of the spring 400.

The SIM-card tray 300 can be withdrawn by essentially reversing the foregoing actions. The spring 400 will initially resist movement of the SIM-card tray 300 from its installed position. Then, approximately half-way through being withdrawn (in this example) the spring 400 will begin to bias the SIM-card tray 300 away from the installed position and essentially assist with the withdrawal of the SIM-card tray 300 to thereby provide user access to the SIM-card tray 300 or the SIM card 302 itself.

Figure 12:
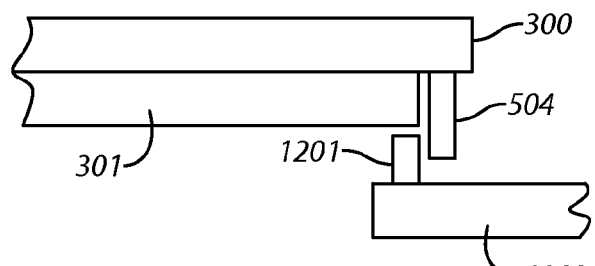
FIG. 12 comprises a side-elevational detail schematic view as configured in accordance with various embodiments of the disclosed concept.

As noted above, the SIM-card tray 300 can include one or more tabs 504 that can serve to prevent the SIM-card tray 300 from being fully withdrawn. FIG. 12 illustrates that such a tab 504 can interact with a corresponding tab 1201 or other surface on another member 1202 (which might comprise, for example, the bottom of the assembly or essentially any other structural element that does not move with the SIM-card tray 300).

So configured, this spring 400 serves to both automatically urge movement of the SIM-card tray 300 into the assembly 200 and out of the assembly 200. This automatic urging, in turn, can greatly facilitate the ease by which a user can manipulate the SIM-card tray 300 to install or remove a SIM card 302. This automatic urging can also assist with ensuring that a SIM card 302 is properly seated with respect to its counterpart electrical connector and that the SIM card 302 is not accidently or inadvertently unseated from that electrical connector.

Figure 13:
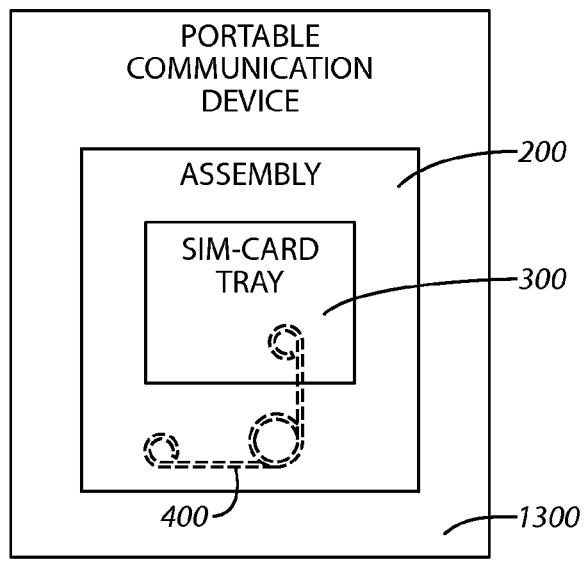
FIG. 13 comprises a block diagram as configured in accordance with various embodiments of the disclosed concept.

These teachings can be beneficially applied in a variety of application settings. With reference to FIG. 13, this can include using such an assembly 200 in a portable communication device 1300 such as a so-called smartphone, cellular telephone, and so forth. In particular, a portable communication device 1300 having, for example, a narrow profile can nevertheless permit a user to more easily meet their SIM-card needs by relying upon the automated biasing of such a SIM-card tray 300.

Those skilled in the art will recognize that a wide variety of modifications, alterations, and combinations can be made with respect to the above described embodiments without departing from the spirit and scope of the disclosed concept, and that such modifications, alterations, and combinations are to be viewed as being within the ambit of the disclosed concept.

We claim:

1. An apparatus comprising:
    an assembly;
    a SIM-card tray configured to move, at least partially, into and out of the assembly to thereby selectively electrically connect and disconnect a SIM card that is disposed in the SIM-card tray to and from at least one electrical connector;
    a biasing member to urge movement of the SIM-card tray with respect to moving the SIM-card tray both into the assembly and out of the assembly.

2. The apparatus of claim 1 wherein the SIM card comprises a micro-SIM card and wherein the SIM-card tray is configured to conformably receive the micro-SIM card.

3. The apparatus of claim 1 wherein the biasing member is configured to automatically urge movement of the SIM-card tray.

4. The apparatus of claim 1 wherein the biasing member comprises a spring.

5. The apparatus of claim 4 wherein a first end of the spring moves with the SIM-card tray.

6. The apparatus of claim 1 further comprising:
    a liner disposed between the SIM-card tray and the biasing member to reduce friction between the SIM-card tray and the biasing member.

7. The apparatus of claim 1 wherein the apparatus comprises a portable communication device.

8. The apparatus of claim 1 wherein the SIM-card tray comprises, at least in part, metal.

9. The apparatus of claim 8 wherein the biasing member comprises, at least in part, an electrically-conductive material and hence serves as a grounding path for the SIM-card tray to thereby electrically protect the SIM card when the SIM card is disposed in the SIM-card tray.

10. A method comprising:
    providing an assembly configured to receive a SIM-card tray;
    providing a biasing member;
    coupling the biasing member to the SIM-card tray such that the biasing member urges movement of the SIM-card tray with respect to moving the SIM-card tray both into the assembly and out of the assembly.

11. The method of claim 10 wherein the SIM card tray comprises a micro-SIM card tray configured to conformably receive a micro-SIM card.

12. The method of claim 10 wherein the biasing member is coupled to automatically urge movement of the SIM-card tray.

13. The method of claim 10 wherein the biasing member comprises a spring.

14. The method of claim 10 wherein coupling the biasing member to the SIM-card tray comprises pivotally connecting a first end of a spring to the SIM-card tray.

15. The method of claim 10 further comprising:
    disposing a liner between the SIM-card tray and the biasing member to reduce friction between the SIM-card tray and the biasing member.

* * * * *